Figure 1:
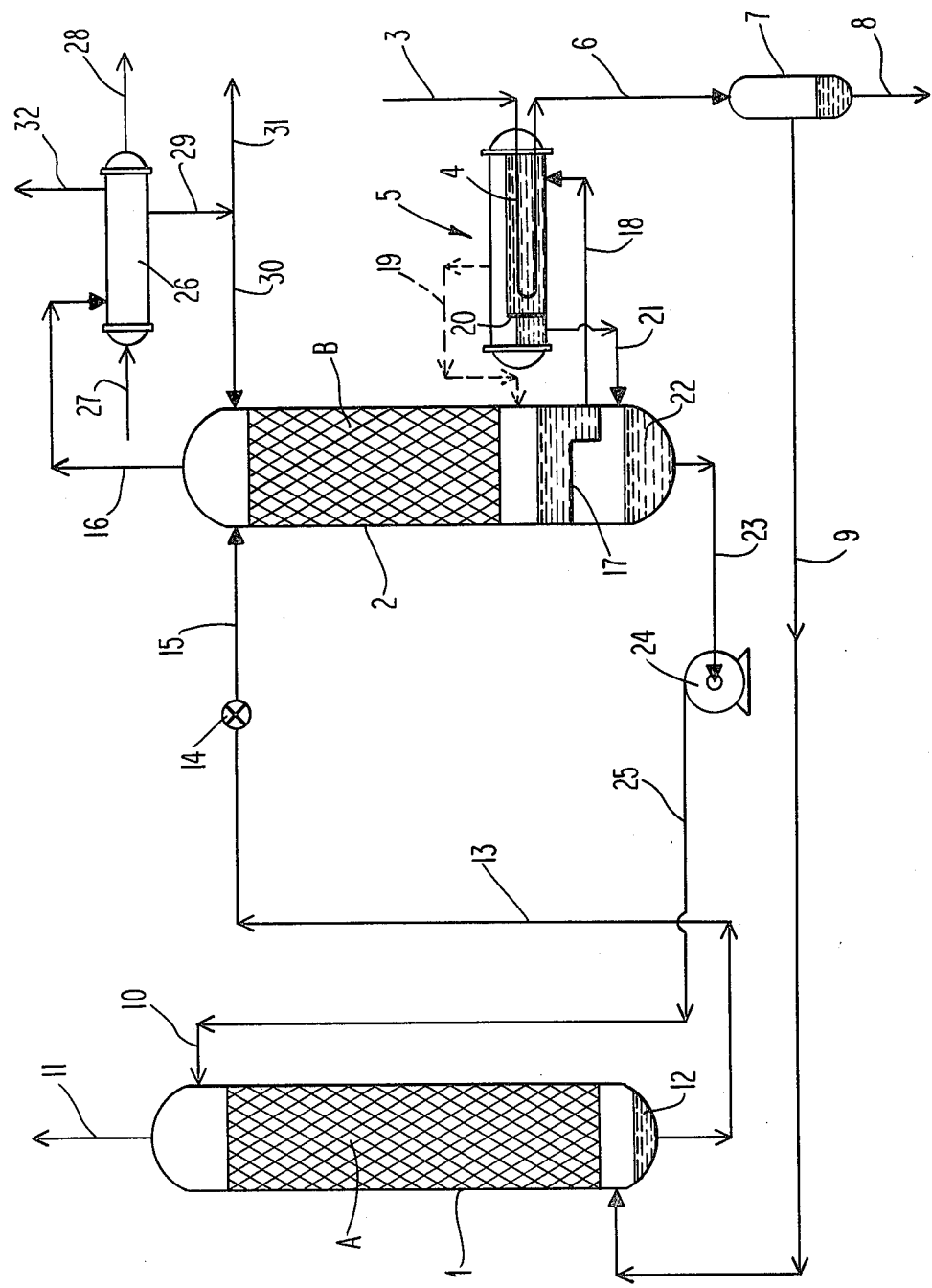

United States Patent [19]
Field et al.

[11] 4,293,531
[45] Oct. 6, 1981

[54] SELECTIVE REMOVAL OF $H_2S$ FROM GAS MIXTURES CONTAINING $CO_2$ AND $H_2S$

[75] Inventors: Joseph H. Field; Donald H. McCrea, both of Pittsburgh, Pa.

[73] Assignee: Benfield Corporation, Pittsburgh, Pa.

[21] Appl. No.: 176,203

[22] Filed: Aug. 7, 1980

[51] Int. Cl.³ .......................................... B01D 53/34
[52] U.S. Cl. .................................. 423/232; 423/220; 423/233
[58] Field of Search ................ 423/220, 232, 233, 210

[56] References Cited

U.S. PATENT DOCUMENTS

| | | | |
|---|---|---|---|
| 2,886,405 | 5/1959 | Benson et al. | 423/233 X |
| 3,338,664 | 8/1967 | Bally et al. | 423/233 |
| 3,725,529 | 4/1973 | Glammarco et al. | 423/233 X |
| 3,931,389 | 1/1976 | Bratzler et al. | 423/232 |
| 3,958,943 | 5/1976 | Carmassi et al. | 423/228 X |
| 4,106,916 | 8/1978 | Tuckett et al. | 423/228 X |

OTHER PUBLICATIONS

U.S. Bureau of Mines Report of Investigations 5660.

*Primary Examiner*—Earl C. Thomas
*Attorney, Agent, or Firm*—Richard C. Willson, Jr.; Dominic J. Terminello

[57] ABSTRACT

A process for selectively absorbing $H_2S$ from gas mixtures which contain $CO_2$ and $H_2S$ in a molar ratio of 4:1 or greater and in which the gas flow rate varies substantially. Alkali metal carbonate solutions are used with absorption under pressure and at an elevated temperature and desorption by steam stripping at about atmospheric pressure. The degree of selectivity of $H_2S$ removal is maintained constant despite substantial variations in the gas flow rate by maintaining a constant stripping steam/gas ratio selected to provide the desired partial pressure of $H_2S$ in the purified gas and by adjusting the solution/gas ratio to a value in the vicinity of that at which the partial pressure of $H_2S$ in the purified gas remains at said selected value while the difference between the partial pressures of $CO_2$ and $H_2S$ in the purified gas reaches a maximum value, and by then maintaining such solution/gas ratio as the gas flow rate varies. The process is particularly applicable to $H_2S$ removal from hot gases produced by the pressure gasification of sulfur-containing coal, oil or the like which are to be used in power generation cycles.

10 Claims, 3 Drawing Figures

SELECTIVE REMOVAL OF H₂S FROM GAS MIXTURES CONTAINING CO₂ AND H₂S

BACKGROUND OF THE INVENTION AND PRIOR ART

This invention relates to the selective removal of $H_2S$ from gas mixtures which contain both $H_2S$ and $CO_2$. More particularly the invention is concerned with the selective removal of $H_2S$ from such mixtures in which the $CO_2$ to $H_2S$ molar ratio is relatively high, generally 4 $CO_2$:1 $H_2S$ or greater, and in which the gas mixtures to be treated undergoes substantial variations in flow rate.

In a number of industrial applications gas mixtures containing relatively small amounts of $H_2S$ and relatively large amounts of $CO_2$ are encountered, and in the treatment of these gases it is often desired to selectively remove the $H_2S$ component, that is, to maximize $H_2S$ removal while minimizing $CO_2$ removal. One such application, with which this invention is particularly concerned, involves the treatment of gases produced by the gasification of sulfur-containing oil, coal or other carbonaceous materials. For example in the gasification of sulfur containing coal with steam and air to produce a so-called low BTU gas, the gas produced may typically contain from 0.5% to 2% $H_2S$ and 8% to 16% $CO_2$ (all percentages on a molar basis). When such gas mixtures are to be used in power generation cycles, it is usually highly desirable to provide for selective $H_2S$ removal, reducing the $H_2S$ residual to as low a level as possible, while at the same time removing as little $CO_2$ as possible. The removal of $H_2S$ to low residual levels is usually required for environmental reasons, that is to minimize the discharge of sulfur oxides to the atmosphere which would occur if the $H_2S$ were permitted to enter the combustion portion of the power cycle. The removal of the sulfur content of the gas as $H_2S$ is generally much less costly and more energy efficient than its removal as sulfur oxides from the stack gases. Minimizing $CO_2$ removal is desired for a number of reasons. First, in a power generation cycle removal of $CO_2$ reduces the gas volume and thereby reduces the energy efficiency of the cycle. Second the removal of the $CO_2$ requires the expenditure of energy and thereby further reduces energy efficiency. Thirdly, the removal of large amounts of $CO_2$ complicates the treatment of the $CO_2/H_2S$ mixtures removed from the gas. Normally such $CO_2/H_2S$ mixtures are treated by the so-called Claus process to oxidize the $H_2S$ to elemental sulfur. The operation of the Claus unit becomes inefficient when the $H_2S$ content of the $CO_2/H_2S$ mixture drops below about 15%. By selectively removing $H_2S$ from a gas having a high $CO_2$: $H_2S$ ratio, e.g. 15:1, the $CO_2/H_2S$ mixture recovered may for example be enriched in $H_2S$ from about 6% $H_2S$ if non selective removal is used to a level of e.g. 15% to 20% $H_2S$, at which higher level it can be treated in a Claus plant with reasonable efficiency.

It has been known for some time that selective removal of $H_2S$ from gas mixtures containing both $CO_2$ and $H_2S$ may be accomplished by scrubbing the gas mixture with aqueous potassium carbonate solutions. See for example U.S. Bureau of Mines Report of Investigations 5660 "Removing Hydrogen Sulfide by Hot Potassium Carbonate Absorption" by J. H. Field et al, U.S. Pat. No. 3,931,389 also discloses the use of potassium carbonate solutions to selectively absorb $H_2S$ from gases containing both $CO_2$ and $H_2S$.

Prior systems of this type employing potassium carbonate solutions, have been mainly based on the marked difference in the absorption rate of $H_2S$ in potassium carbonate solutions as compared to $CO_2$. Generally speaking, the absorption rate of $H_2S$ in aqueous potassium carbonate is about ten times or higher than the rate of $CO_2$ absorption. Advantage is taken of this difference in absorption kinetics by designing the absorption column with relatively low mass transfer capacity, thus limiting the amount of $CO_2$ absorbed by limiting the time of contact with the absorbent solution.

While good $H_2S$ selectively can be obtained when the volume of gas to be treated remains constant by taking advantage of the differential in absorption kinetics between $H_2S$ and $CO_2$, it has been found that this approach is not satisfactory in systems in which the gas volume to be treated undergoes substantial variation. In such systems, the $H_2S$ selectivity achieved undergoes wide variations as the gas flow varies. With the system designed to achieve the desired degree of purification and the desired degree of $H_2S$ selectivity at the maximum gas flow rate, the selectivity will fall off sharply as the gas flow rate falls off. This is due to the increased residence time for absorption as the gas flow decreases with a constant mass transfer volume in the absorption column. Because of the sharp differences in the gas-liquid equilibrium values for $CO_2$ and $H_2S$, the driving forces for $CO_2$ absorption (i.e. the difference between the partial pressure of $CO_2$ in the gas phase and the equilibrium partial pressure of $CO_2$ above the scrubbing solution) are far greater for $CO_2$ than the corresponding driving forces for $H_2S$ absorption. As a consequence, the increased residence time will greatly increase $CO_2$ absorption while only slightly or negligibly increasing $H_2S$ absorption. The large relative increase in $CO_2$ absorption at lower gas flow rates sharply reduces the desired degree of selective $H_2S$ absorption. While it is theoretically possible to vary the mass transfer capacity of the absorber during operation (for example by using multiple absorbent solution inlets at different levels in the absorber) in practice such systems are expensive and difficult to design and operate, particularly when the gas flow changes rather rapidly and at frequent intervals.

Power generation systems utilizing gases which require selective $H_2S$ removal are good examples of systems involving relatively large variations in gas flow to the purification system in response to varying load demands on the power generation system. Often such systems involve a four-fold variation in gas flow to the purifier with the changes in flow often taking place in a period of minutes. In a purification system based on absorption kinetics the selectivity of $H_2S$ removal falls off rapidly as the gas flow decreases with the result that at decreasing loads greater amounts of $CO_2$ are absorbed and the off-gases from the regenerator become leaner and leaner in $H_2S$.

GENERAL DESCRIPTION OF INVENTION AND PREFERRED EMBODIMENTS

According to the invention a method has been discovered for operating gas purification systems using aqueous alkali metal carbonate absorbents in which gases containing both $CO_2$ and $H_2S$, in a $CO_2$:$H_2S$ molar ratio of more than about 4:1 can be treated to selectively remove $H_2S$ while maintaining such selectivity substantially constant despite large changes in the rate of gas flow to the purification system. A cyclic absorption system is employed in which the absorbent solution is circulated between a countercurrent absorber operating at an elevated temperature and super atmospheric pressure where selective absorption of $H_2S$ occurs, and a regenerator operating at approximately atmospheric pressure where the absorbed gases ($CO_2$ and $H_2S$) are removed by pressure reduction and countercurrent steam stripping. The selective removal of $H_2S$ according to this invention does not depend on the absorption kinetics and thus the degree of selectivity does not vary with increases or decreases of gas flow to the system. The invention is based, rather, in its broader aspects, on the discovery that the partial pressure of $H_2S$ in the purified gas is essentially a function only of the stripping steam input to the regenerator (that is the ratio of stripping steam fed to the regenerator to feed gas fed to the absorber, hereafter referred to as the steam/gas ratio) and is essentially independent of other operating variables over wide ranges. In particular it has been found that the $H_2S$ partial pressure in the purified gas is essentially independent of the ratio of scrubbing solution flow to gas flow (hereafter referred to as the solution/gas ratio) as the solution/gas ratio varies over a wide range. The $CO_2$ partial pressure in the purified gas, on the other hand, is found to be quite sensitive to operating variables, and in particular to the solution/gas ratio, that do not affect the corresponding $H_2S$ partial pressure. Advantage is taken of this difference in the response of $H_2S$ and $CO_2$ to changes in the system variables to obtain a high degree of selectivity of $H_2S$ absorption without relying on absorption kinetics and to maintain such selectivity despite large changes in gas flow to the system. Specifically, it has been found that at a constant steam/gas ratio, selected to give the desired $H_2S$ partial pressure in the purified gas the partial pressure of $CO_2$ in the purified gas will undergo a continuous and many-fold change as the solution/gas ratio varies from lowest to highest ratios. The partial pressure of $H_2S$, on the other hand, at the same constant steam/gas ratio, remains at a virtually constant plateau (except for the lowest range of solution/gas ratios) as the solution/gas ratio varies over the same range. By operating in the vicinity of the solution/gas ratio at which the partial pressure of $H_2S$ in the purified gas remains at the desired selected value, and at which the difference between the partial pressure of $CO_2$ and $H_2S$ reaches a maximum value, the selectivity of $H_2S$ absorption is maximized. The degree of selectivity obtained under these conditions remains independent of gas flow if the selected solution/gas ratio and the selected steam/gas ratio are maintained substantially constant in response to variations in gas flow.

Figure 2:
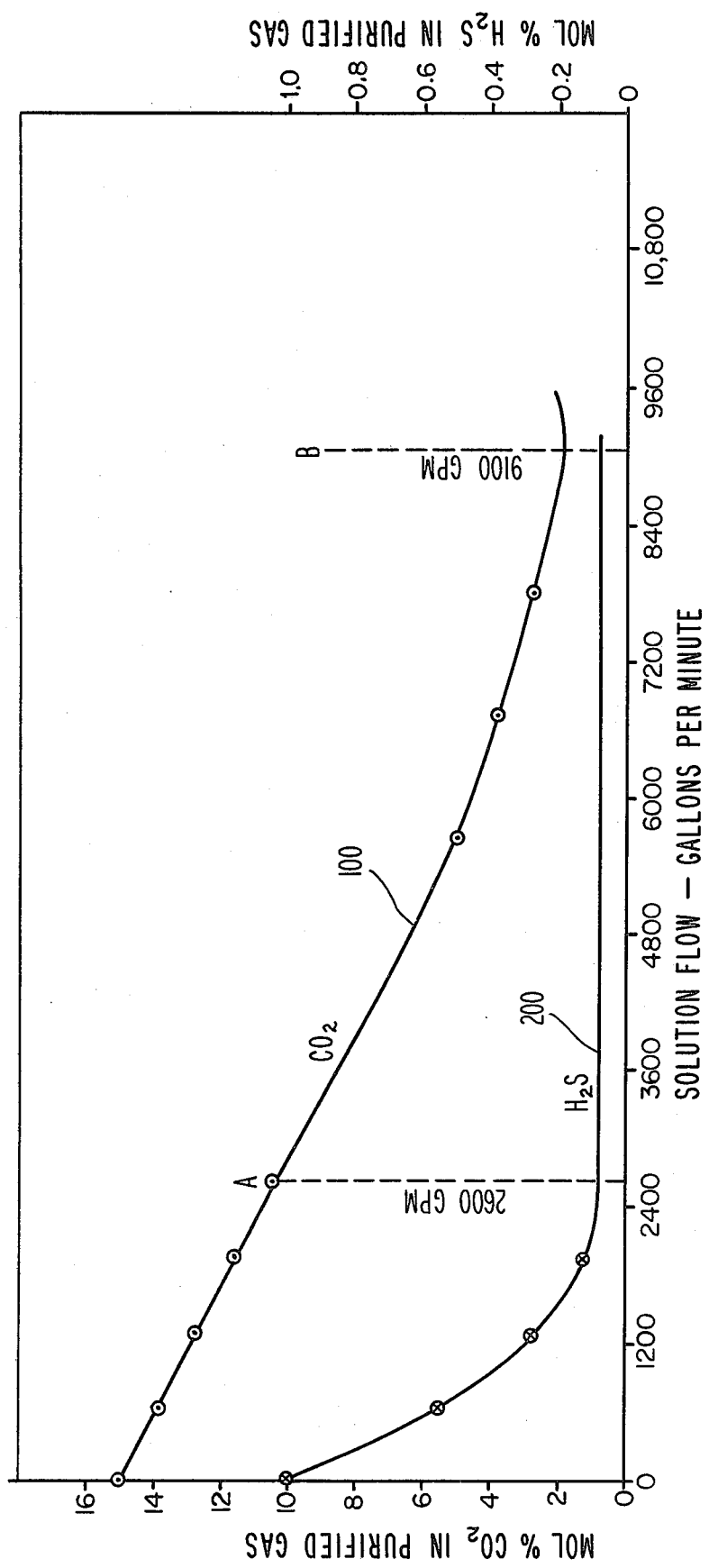
Figure 3:
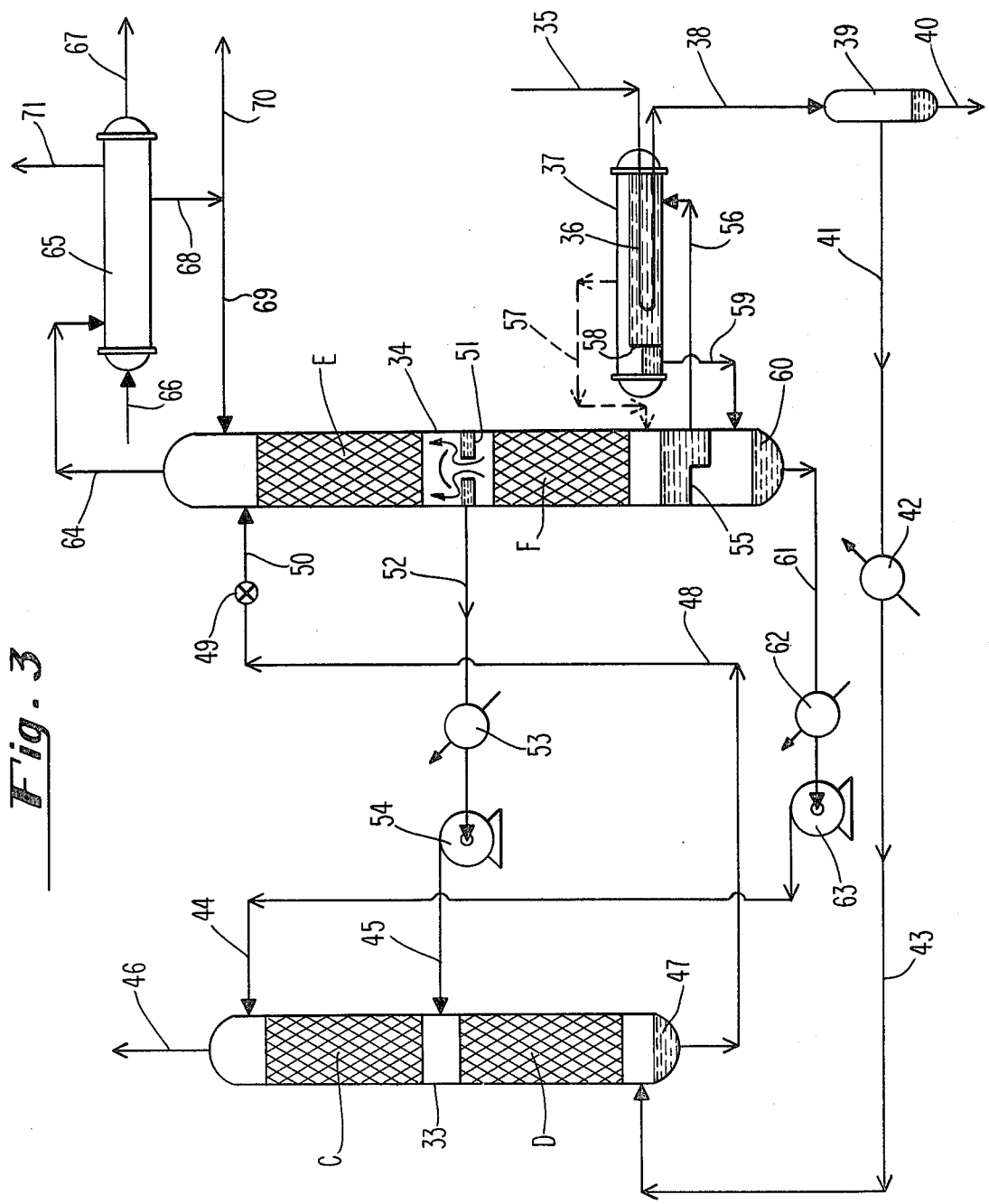

For a better understanding of the invention, reference is now made to the accompanying drawings in which FIG. 1 is a diagrammatic flowsheet illustrating one embodiment of the invention and, FIG. 2 is a graph showing the outlet concentration of $CO_2$ and $H_2S$ in the purified gas at a constant steam/gas ratio as the solution/gas ratio varies over a wide range, and FIG. 3 is a diagrammatic flowsheet illustrating a second embodiment of the invention.

Referring now to FIG. 1, the scrubbing system comprises an absorption column 1 and a regeneration column 2 between which the scrubbing solution is continuously circulated. The raw feed gas containing $CO_2$ and $H_2S$ in a $CO_2$:$H_2S$ molar ratio of 4:1 or higher enters the system through line 3. The invention is particularly applicable to the selective desulfurization of gases in which the $CO_2$:$H_2S$ molar ratio is at least 6:1 and most typically the invention will find its most advantageous application to gases which contain from 4% to 35% $CO_2$ and from 0.4% to 2% $H_2S$ in a $CO_2$:$H_2S$ molar ratio of from 6:1 to 30:1. As mentioned previously, gases produced by the pressure gasification of sulfur containing coal, oil, fuel gases or other carbonaceous materials by reaction of such materials with steam and air, or steam and oxygen, are typical of the type of gases which are advantageously selectively desulfurized by means of the invention. Such gases after preliminary treatment to remove soot, ash, and the like are at a high temperature and are saturated with steam. To avoid heat losses such gases are preferably desulfurized under pressure and without cooling to low temperatures. Using the system of the invention, removal of a high proportion of the $H_2S$ content and a relatively lower proportion of the $CO_2$ content is possible without loss of pressure and without cooling to low temperatures.

In the embodiment shown in FIG. 1, the raw feed gas is hot and saturated with steam as it enters the system and the heat contained in the feed gas is used to heat the scrubbing solution to generate stripping steam. To this end, the hot feed gas passes through tube bundle 4 of the reboiler designated generally by the numeral 5 (to be described below) where heat is transferred to the scrubbing solution to generate steam. The feed gas leaves reboiler 5 by line 6 and after passing through knock-out drum 7, where condensate is removed and leaves the system by line 8, flows by line 9 to the bottom of absorption column 1. Column 1 is suitably equipped in the cross-hatched portion designated by the letter A with means for producing intimate gas-liquid contact. For this purpose, Section A is provided with packing materials such as Raschig rings, Berl saddles, Intalox saddles, Pall rings or other types of bodies exposing a large surface of liquid to the gas flowing through the packing. In place of packing, other means, such as contact trays, e.g., sieve trays, may be employed for insuring intimate gas-liquid contact.

If it is desired that the system operate such that there will be essentially no variation in the selectivity of $H_2S$ absorption from the highest to the lowest gas flow rates, it is necessary to provide sufficient mass transfer capacity in Section A of the absorber that the absorber will not be kinetically limited with respect to $CO_2$ absorption at the highest gas flow rate. This means that sufficient mass transfer capacity (i.e., a sufficient volume of packing, or sufficient number of contact plates) must be provided to insure that at the maximum rate of gas flow, the residual concentration of $CO_2$ in the purified gas will not significantly decrease if additional mass transfer capacity were provided. While still further mass transfer capacity beyond that necessary to avoid kinetic limitations on $CO_2$ absorption will not adversely affect the $H_2S$ selectivity or heat economy, such excess mass transfer capacity will of course increase the cost of the equipment required. In some cases, especially where the system will operate most of the time at or near the maximum gas flow rate, it may be desirable to reduce the mass transfer capacity of the absorber so that, at the highest gas flow rate, $CO_2$ absorption is kinetically limited to some extent. The kinetic limitation on $CO_2$ absorption will further enhance selectivity at the highest gas flow rate. As the gas flow rate decreases, this kinetic limitation will diminish, and there will be some decrease in selectivity until the absorber is no longer kinetically limited, at which point the selectivity of $H_2S$ absorption will become constant as the gas flow decreases further. By operating in this manner, $H_2S$ selectivity is optimized at the highest gas flow rate while at the lower gas flow rates, $H_2S$ selectivity is held at an acceptable constant level.

The raw gas entering the bottom of absorption column 1 passes upwardly countercurrent to the scrubbing solution introduced into the top of the column by line 10. Intimate contact between the gas and liquid takes place in Section A where $H_2S$ is selectively absorbed together with some $CO_2$ and the purified gas leaves absorption column 1 by line 11.

The absorption column should operate at substantial superatmospheric pressures of at least 100 pounds per square inch gage (psig) and preferably at least 200 psig. Absorption pressures in most typical applications will range from 250 to 1500 psig.

Optimum scrubbing solution temperatures in the absorption zone will depend on a number of factors. It is generally preferable in a power cycle type application to treat the raw feed gas at the highest temperature possible, namely, at the temperature prevailing in the regeneration column. It may be desirable, however, in some cases to operate the absorber at somewhat lower temperatures. For example, if the feed gas contains a high partial pressure of carbon monoxide, the formation of potassium formate may become a problem at high absorption temperatures. This problem can be greatly mitigated by operating the absorber at somewhat reduced temperatures by reducing the temperature of the feed gas, by cooling the hot solution from the regenerator before introduction into the absorber, or both. Where a low residual amount of $H_2S$ is desired in the purified gas together with good selectivity, cooling of the solution between the regenerator and the absorber may also be desirable. FIG. 3 illustrates a system designed to operate at lower absorption temperatures and will be described in detail below.

With the above considerations in mind, the absorber temperatures to be used in the system of the invention will range broadly from 60° C. to 140° C. and will preferably range in the most typical applications from 80° C. to 120° C. The temperature of the solution in various portions of the absorber column may vary considerably due to the differing temperatures of the stream or streams of solution entering the absorber, the temperatures and steam content of the feed gas entering the bottom of the absorber, and the heat of absorption of the $CO_2$ and $H_2S$ absorbed in the column. Most typically, the solution temperature will be lowest at the top of the absorber and highest at the bottom. The ranges of absorption temperatures given above refer to the mean solution temperature in the mass transfer section (viz. Section A) of the absorber.

The scrubbing solution containing absorbed $CO_2$ and $H_2S$ accumulates at the bottom of column 1 in sump 12 and is conducted by line 13 to a pressure letdown valve 14 where the pressure is reduced to that prevailing at the top of regenerator tower 2, and the depressurized solution then flows into the top of regenerator tower 2 by line 15.

As stated previously, the scrubbing solution is a relatively concentrated solution of an alkali metal carbonate, particularly potassium or sodium carbonate. Particularly preferred are concentrated potassium carbonate solutions having potassium carbonate concentrations of 15% to 45% and preferably 20% to 35% by weight (these concentrations being calculated on the assumption that all potassium is present as potassium carbonate). Such solutions may contain corrosion inhibitors such as small amounts of potassium vanadate. Additives which increase the rate of desorption such as ethanolamines, amino acids, such as glycine, relatively large amounts of $As_2O_3$, are preferably omitted from the solution since such additives increase the rate of $CO_2$ desorption more than they increase the rate of $H_2S$ desorption and consequently make it more difficult to achieve selective absorption of $H_2S$.

As the depressurized solution enters the top of regeneration column 2 via line 15, it is immediately freed of a portion of its content of $CO_2$ and $H_2S$ through the reduction in pressure occurring at the top of the regeneration column, and the mixture of steam and desorbed gases which flash off leave the top of the regeneration column by line 16. Further desorption of $CO_2$ and $H_2S$ is carried out in the mass-transfer section of the regenerator, designated by the cross-hatched portion B, by countercurrent contact of the solution with stripping steam introduced into the bottom portion of the column and rising up through Section B countercurrent to the descending solution.

It is highly preferred, for the purposes of achieving good $H_2S$ selectivity to equip the mass-transfer Section B of the regenerator with packing materials such as rings, saddles or other such shapes for improving gas-liquid contact, rather than with trays. The reason for this is that with a trayed column, the residence time of the solution in the regeneration column will remain at a relatively high constant level at low rates of gas flow and correspondingly low rates of solution flow. This higher residence time at low gas flows favors the desorption of $CO_2$. Increased desorption of $CO_2$ in the regenerator favors increased $CO_2$ absorption in the absorber and correspondingly lower $H_2S$ selectivity.

The pressure in the regeneration column should be in the vicinity of atmospheric. In some applications it is advantageous to place the regenerator under a small positive pressure up to about 40 pounds per square inch absolute (psia) so that the effluent gases leaving by line 16 (principally steam plus $CO_2$ and $H_2S$) can be delivered to their point of utilization (such as Claus plant) without the use of a compressor. In other cases pressures slightly below atmospheric may be desirable. Regenerator pressures will generally range from 9 psia to 40 psia and preferably 18 psia to 25 psia as measured at the top of the regenerator.

The absorption and desorption reactions that occur in columns 1 and 2 respectively, are well known in the art being described for example in U.S. Pat. No. 2,886,405.

The regenerated solution, after steam stripping in Section B, collects at the bottom of regeneration column 2 on a trapout tray 17. Solution is withdrawn from tray 17 by line 18 and circulated through reboiler 5 where it passes over tube bundle 4 supplied with hot saturated feed gas. Steam generated by contact of the solution with tube bundle 4 is introduced into the bottom of the regenerator column by line 9 and flows upwardly through the column countercurrent to descending solution. The scrubbing solution overflows weir 20 and is withdrawn from the reboiler by line 21 and introduced into the bottom of regenerator column 2 where it collects in sump 22. From sump 22, the hot regenerated solution is returned via line 23, recycle pump 24, line 25 and line 10 to the top of absorber column 1.

At the top of the regenerator, the mixture of desorbed gases and steam passes out of the top of the regenerator by line 16 and flows to a condensor 26 cooled by a cooling medium supplied by line 27 and leaving by line 28. Sufficient water is condensed to maintain water balance in the scrubbing system, the water condensate being fed by lines 29 and 30 to the top of the regenerator. Excess condensate may be purged by line 31. The partially cooled gas stream consisting principally of $CO_2$, $H_2S$ and water vapor leaves the system by line 32. Typically this mixture will be treated in a Claus unit, or other suitable unit, to recover the sulfur content by oxidation of the $H_2S$ to elemental sulfur. The selective absorption of the $H_2S$ will result in a regenerator off-gas that is enriched in $H_2S$ and accordingly more amenable to economic treatment to convert the $H_2S$ to elemental sulfur and avoid air pollution problems.

To operate the system illustrated in FIG. 1 in accordance with the invention (i.e. to obtain selective removal of $H_2S$ and to maintain that selectivity independent of variations in the rate of gas flow to the system) the following procedure is followed.

As the first element in the procedure, the steam/gas ratio is adjusted to a value to provide the desired residual partial pressure of $H_2S$ in the purified gas. As pointed out above, it has been found surprisingly that when dealing with the type of raw feed gas with which the invention is concerned, the partial pressure of $H_2S$ in the purified gas depends essentially only on the steam/gas ratio and is independent of other system operating variables over wide ranges. The proper steam/gas ratio will be that which reduces the equilibrium partial pressure of $H_2S$ above the regenerated solution at the bottom of the regenerator to a value which will provide the desired residual $H_2S$ partial pressure in the purified gas. Because of the high rate of $H_2S$ absorption, the outlet partial pressure of $H_2S$ at the top of the absorber will be essentially the same as, or only slightly higher than, the equilibrium partial pressure of $H_2S$ above the regenerated solution at the temperature it is delivered to the top of the absorber. If there is no cooling of the solution between the regenerator and the absorber, the equilibrium pressure of $H_2S$ above the regenerated solution at the bottom of the regenerator should be the same as, or only slightly lower than, the desired partial pressure of $H_2S$ at the top of the absorber. If the solution is cooled between the bottom of the regenerator and the top of the absorber, a lower steam/gas ratio can be employed (for a given desired $H_2S$ partial pressure in the purified gas) since cooling of the solution reduces the $H_2S$ partial pressure above the solution. In such case, the solution is regenerated to the point at which, after cooling, the equilibrium partial pressure over the regeneration solution is equal to, or only slightly lower than, the desired partial pressure of $H_2S$ in the purified gas.

The proper value of such steam/gas ratio can be determined empirically or by calculation using the known equilibrium pressures of $H_2S$ over alkali metal carbonate solutions, while taking into consideration the following factors. First, the steam/gas ratio will be directly proportional to the quantity of $H_2S$ to be removed from the gas. Second, the lower the desired partial pressure of $H_2S$ in the purified gas, the higher will be the required steam/gas ratio required to provide that desired residual partial pressure. Because of the very low equilibrium pressures of $H_2S$ above the absorbent solution as the solution becomes more highly regenerated with respect to $H_2S$, the driving forces for $H_2S$ desorption at the bottom of the regeneration column become very low requiring very high steam/gas ratios to provide further reductions in $H_2S$ concentration in the regenerated solution. The use of excessively high steam/gas ratios tend to favor $CO_2$ desorption because of the higher driving forces for $CO_2$ desorption, and this in turn increases $CO_2$ absorption, reducing the degree of selectivity of $H_2S$ absorption which can be achieved. For these reasons, the lower the desired partial pressure of $H_2S$ in the purified gas, the higher will be the required steam/gas ratio, and the lower will be the achievable degree of selective $H_2S$ absorption. In general the practical lower limit for the $H_2S$ level in the purified gas while still obtaining reasonable steam usage and good $H_2S$ selectivity will be a residual $H_2S$ partial pressure of not less than 0.05 pounds per square inch (psi) and preferably not less than 0.1 psi. A third factor influencing the steam/gas ratio is the degree to which the solution is cooled, if at all, between the regenerator and the absorber. As pointed out above, cooling of the solution reduces the equilibrium partial pressure of $H_2S$ above the solution and this in turn permits the use of a lower steam/gas ratio to achieve a given level of $H_2S$ partial pressure in the purified gas. A fourth factor influencing the steam/gas ratio is the pressure at the bottom of the regenerator. In general, the required steam/gas ratio increases with increasing regenerator pressure since the $H_2S$ partial pressure in the regenerator increases in direct proportion to the pressure, requiring larger quantities of steam to reduce the $H_2S$ partial pressure to a level at which further desorption will occur.

After having selected the steam/gas ratio that will provide the desired residual partial pressure of $H_2S$ in the purified gas, the next element in the procedure is to maintain the selected steam/gas ratio substantially constant by increasing or decreasing the stripping steam flow to the regenerator proportionately as the feed gas flow to the absorber varies. In the arrangement shown in FIG. 1, the feed gas heats the reboiler 5, and the reboiler system should be designed to generate stripping steam in direct proportion to the flow rate of the feed gas. The reboiler system 5 is of course shown diagrammatically only and it is understood that suitable means are provided to insure that stripping steam production will vary in direct proportion to the rate of feed gas flow, such as by providing variable areas of heat exchange surface exposed to the gas flow as the rate of gas flow varies. The stripping steam may of course be provided other than by a reboiler heated by the hot feed gas as shown in FIG. 1. Regardless of the source of the stripping steam, means should be provided to maintain a constant steam/gas ratio, viz. the ratio of stripping steam fed to the bottom of the regenerator to the feed gas fed to the bottom of the absorber. With the steam/gas ratio controlled at a constant value, the concentration of $H_2S$ in the purified gas will remain constant at the preselected value although other operating variables, such as the solution/gas ratio, vary over wide ranges as will be shown in the examples below.

Having adjusted the steam/gas ratio to a constant value selected to give the desired residual $H_2S$ partial pressure in the purified gas, as described above, the next element in the procedure is to adjust the solution/gas ratio (viz. the ratio of the rate of scrubbing solution flow mass transfer capacity the larger this temperature difference. When operating according to the preferred embodiment of the invention, the mass transfer capacity is limited such that the vapor/liquid temperature difference defined above is in the range of from 2° C. to 10° C. and preferably from 4° C. to 8° C. Sufficient mass transfer capacity must, of course, always be provided to permit the desired desorption of $H_2S$ and this imposes a lower limit on the amount of mass transfer capacity in the regenerator.

While the invention does not depend on any particular theory or explanation for the behavior described above, it is believed that this observed behavior is the result of a complex interaction among the many factors which affect the system, including particularly the differing heats of absorption and desorption of $CO_2$ and $H_2S$, the differing reaction kinetics of $CO_2$ and $H_2S$, and the different shapes of the equilibrium curves for $CO_2$ and $H_2S$ over aqueous alkali metal carbonate solutions.

It is believed that the insensitivity of the equilibrium pressure of $H_2S$ over the regenerated solution to process variables other than the steam/gas ratio is related principally to the three factors mentioned above. When regenerating alkali carbonate solutions containing chemically reacted $CO_2$ and $H_2S$ by steam stripping, the reaction kinetics of $CO_2$ and $H_2S$ desorption differ greatly. The $H_2S$ desorbs very rapidly relative to the $CO_2$ so that the extent of its removal is fixed by a close approach between the partial pressure of $H_2S$ in the vapor and the equilibrium pressure of $H_2S$ over the solution. The shape of the $H_2S$ equilibrium curve is such that this close approach, or pinch point, will occur in the bottom portion of the regenerator tower. As a consequence, solution heating and steam condensation that occurs near the top of the regenerator has no effect on the quantity of steam available to dilute and thus lower the $H_2S$ partial pressure in the vapor phase near this pinch point, and thus the partial pressure of $H_2S$ over the regenerated solution at the bottom of the regenerator tends to be solely dependent on the amount of stripping steam introduced at the bottom. Similarly, the amount of $CO_2$ removal in the regenerator has very little effect on the equilibrium pressure of $H_2S$ over the regenerated solution. Desorption of $CO_2$ and resulting steam condensation above the $H_2S$ pinch point described above has no effect. When $CO_2$ is desorbed below the $H_2S$ pinch point, the heat of desorption of $CO_2$ is such that one volume of steam is condensed per volume of $CO_2$ desorbed. Thus the total volume of vapor remains the same regardless of the amount of $CO_2$ absorbed and consequently the partial pressure of $H_2S$ in the vapor remains unchanged, dependent only on the amount of steam introduced at the bottom of the regenerator.

With regard to the remarkable insensitivity of $H_2S$ absorption to the solution/gas ratio while $CO_2$ absorption undergoes large variations as that ratio changes, it is believed that this results principally from the differing shapes of the equilibrium curves for $H_2S$ and $CO_2$ over alkali carbonate solutions and from the high proportion of $CO_2$ in the feed gas and the relatively larger amount of $CO_2$ absorbed by the solution. The equilibrium partial pressure of both $CO_2$ and $H_2S$ over the solution increases slowly with increasing acid gas content when only a small quantity of acid gas has been absorbed. Conversely when a large quantity has been absorbed, a small addition causes a large increase in equilibrium pressure. In the system of this invention, only a small amount of $H_2S$ is removed from the feed gas and the regenerated solution contains only a small quantity of $H_2S$. As a consequence, the equilibrium pressure of $H_2S$ increases only slightly as the solution passes through the absorber column; the extent of $H_2S$ removal is fixed by the $H_2S$ equilibrium pressure at the top of the absorber; and the partial pressure of $H_2S$ in the gas phase exceeds the $H_2S$ equilibrium pressure throughout the remainder of the absorber tower. In the case of $CO_2$ however, a relatively large amount of $CO_2$ is absorbed by the solution and the regenerated solution contains a relatively large amount of $CO_2$. As a consequence, the equilibrium pressure of $CO_2$ increases sharply as the solution passes through the absorber tower and, at any given solution/gas ratio, the $CO_2$ equilibrium pressure will approach the $CO_2$ partial pressure in the feed gas and further $CO_2$ absorption will cease regardless of the $CO_2$ residence time in the absorber. Thus, the partial pressure of $CO_2$ in the purified gas becomes a function of the solution/gas ratio because of the equilibrium barrier that is set up limiting futher $CO_2$ absorption. The $H_2S$ partial pressure in the purified gas on the other hand remains independent of the solution/gas ratio over a wide range.

EXAMPLE 1

The following example illustrates the application of the invention for the purification of a hot, saturated gas mixture produced by the pressure gasification of a sulfur containing coal with steam and air. After purification in accordance with the invention, the gas is employed as feed gas to a so-called combined power cycle where the gas is first burned in a gas turbine and then passed through heat exchange units to generate steam which is in turn employed to operate steam turbines. The combined power cycle has a variable load demand which results in a fourfold variation in feed gas flow to the power cycle with major changes in load demand and corresponding gas flow occurring in a matter of minutes a number of times a day.

The raw feed gas from the pressure gasifier is first water scrubbed to remove tars and particulates with recovery of the heat in the hot gas in the form of saturated steam. The hot, saturated gas from the water scrubber has a flow rate (on a dry basis) varying between 6675 pound mols per hour (lb. mols/hr.) at minimum flow and 26,700 lb. mols/hr. at maximum flow, is at a temperature of 185° C. and is saturated with water vapor. It has the following composition (on a dry basis):

| Component | Mol Percent |
|---|---|
| $CO_2$ | 15% |
| $H_2S$ | 1% |
| $N_2$ | 49% |
| CO | 17% |
| $H_2$ | 17% |
| Hydrocarbons | 1% |
| | 100% |

The above raw feed gas is introduced into a system of the type shown in FIG. 1, flowing first through reboiler system 5 and then flowing into the bottom of the absorber at a temperature of 121° C. and under a pressure of 300 psig. The mass transfer capacity of the absorber is designed to take the maximum gas flow of 26,700 lb. mols/hr. with sufficient capacity so that it is not kinetically limited. This is accomplished by providing 2,455 circulating in the system to the rate of gas flow to the absorber) to a value in the vicinity of that at which the partial pressure of $H_2S$ in the purified gas remains at the desired selected value and at which the difference between the partial pressure of $CO_2$ and $H_2S$ reaches a maximum value. As stated above, and as the examples which follow will illustrate, the residual partial pressure of $H_2S$ in the purified gas, at a constant steam/gas ratio, remains essentially constant over a wide range of solution/gas ratios, (except for the lowest range of solution/gas ratios where the residual $H_2S$ partial pressure will vary rapidly). The partial pressure of $CO_2$ in the purified gas, on the other hand, over the same range of solution/gas ratios, undergoes a continuous large change and reaches a relatively high value over the range at which the $H_2S$ partial pressure remains at a pre-selected constant value. By operating in the vicinity of the solution/gas ratio at which the difference between the $CO_2$ and $H_2S$ partial pressures in the purified gas reaches a maximum value while at the same time the $H_2S$ partial pressure remains at the preselected constant value, the selectivity of $H_2S$ absorption is maximized.

The solution/gas ratio at which maximum selectivity occurs will vary considerably depending on factors such as the composition of the gas to be purified, particularly the absolute concentrations of $CO_2$ and $H_2S$, the $CO_2:H_2S$ ratio in the feed gas, and the desired residual partial pressure of $H_2S$ in the purified gas. The desired solution/gas ratio can be determined empirically by varying the solution/gas ratio while holding the steam/gas ratio constant, or it may be determined by calculation using the following general stepwise procedure. First, based on absorber pressure and temperature and $CO_2$ and $H_2S$ concentration in the raw gas determine the $CO_2$ and $H_2S$ content of the rich solution (that is the spent solution at the bottom of the absorber) on the assumption that the equilibrium partial pressure of $CO_2$ and $H_2S$ over the rich solution is equal to their partial pressures in the raw feed gas. Second, employ the steam/gas ratio in the regenerator which has already been determined as described above to provide the desired partial pressure of $H_2S$ in the purified gas. As discussed above, the steam/gas ratio in the regenerator is a function only of the amount of $H_2S$ in the raw gas, the partial pressure of $H_2S$ in the purified gas, the regenerator pressure and the solution temperature entering the absorber. It is independent of the amount of $CO_2$ removed and other operating parameters. Third, based on the steam/gas ratio selected, determine the quantity of $CO_2$ remaining in the lean solution (that is the regenerated solution at the bottom of the regenerator). Fourth, calculate the difference between the $CO_2$ content of the rich solution (determined in step one) and the $CO_2$ content of the lean solution (determined in step three) and from this difference calculate the solution/gas ratio corresponding to this differential $CO_2$ content. This will be the solution/gas ratio at or close to which maximum $H_2S$ selectivity occurs. Fifth, ascertain that the calculated solution/gas ratio will provide the required $H_2S$ partial pressure in the purified gas by determining the $H_2S$ content of the rich solution from the assumed quantity of $H_2S$ removed from the raw gas and the calculated circulation rate. The $H_2S$ content determined in this manner should be slightly lower than the $H_2S$ content determined in step one. If not the solution/gas ratio is increased to provide the desired $H_2S$ partial pressure in the purified gas. Based on the values determined by the above procedure the amount of mass transfer capacity required in the regenerator can be determined. The capacity required will be that necessary to change the $CO_2$ content of the solution between the top and the bottom of the regenerator by the differential amount determined as described above using known techniques based on equilibrium pressures of $CO_2$ and mass transfer rates for $CO_2$ desorption. If the mass transfer capacity of the regenerator is less than that required to removed the differential amount of $CO_2$ it will be kinetically limited with respect to $CO_2$ removal, and as already discussed, the $H_2S$ selectivity will be further improved. The mass transfer capacity of the regenerator must, of course, be sufficient to remove the required amount of $H_2S$ that will provide the desired $H_2S$ partial pressure in the purified gas.

Having selected the solution/gas ratio as described above the next element of the procedure is to maintain the selected solution/gas ratio at a constant value by adjusting the solution flow in direct proportion to variations in the rate of feed gas flow to the absorber. In the system shown in FIG. 1, this is accomplished by increasing or decreasing the solution circulation rate by suitably regulating circulating pump 24 as the rate of feed gas flow into the bottom of the absorber through line 9 respectively increases or decreases. Suitable instrumentation and controls to regulate automatically the solution circulation rate in proportion to feed gas ratio will be of course be used in the design and operation of a commercial plant.

With the system operated in the manner described above, the selectivity of $H_2S$ absorption will not vary substantially with even large variations in the rate of gas flow to the absorber. Constant $H_2S$ selectivity means of course a constant composition for the purified gas and for the regenerator off-gases. In a power cycle, a constant $CO_2$ and $H_2S$ level in the fuel gas delivered to the cycle is of great importance. A constant, maximized level of $CO_2$ in the gas is important from the standpoint of maximizing energy recovery, while a constant, minimized level of $H_2S$ is important from the standpoint of avoiding air pollution and of avoiding damage to gas turbine blades often used in such power cycles. Constant composition of the regenerator off-gases is important in avoiding operating problems in the sulfur recovery plant where such off-gases are treated.

According to a particularly preferred embodiment of the invention, the selectivity of $H_2S$ absorption is further enhanced by limiting the mass transfer volume of the regenerator to restrict the desorption of $CO_2$. Because of the much higher rate of $H_2S$ desorption compared with $CO_2$ desorption it has been found that the mass transfer capacity requirements for $H_2S$ desorption are satisfied with far less capacity than for $CO_2$, and by restricting the mass transfer capacity in the regenerator, the $CO_2$ desorption may be limited. This means in turn that less $CO_2$ will be absorbed in the absorber since the regenerated scrubbing solution returned to the absorber will be more saturated in $CO_2$, with the result that higher $H_2S$ selectivity is obtained. The desired limitation in mass transfer capacity can be measured by the difference in temperature between the vapors leaving the top of the regenerator mass transfer section (Section B in FIG. 1) and the "after flash" temperature of the scrubbing solution. The "after flash" temperature of the scrubbing solution is the temperature of the solution immediately after the flashing that occurs on depressurization, that is the solution temperature at the top of the regenerator mass transfer section. The more limited the cubic feet of packing consisting of pall rings 2 inches in diameter and length arranged in a bed 12.5 feet in diameter and 20 feet deep.

The absorbent solution consists of an aqueous solution of potassium carbonate containing 30% by weight potassium carbonate.

To satisfy sulfur emission standards and to protect the gas turbine blades, the desired level of $H_2S$ in the purified gas is selected as 0.08% (a partial pressure of $H_2S$ in the purified gas of 0.24 psi). The amount of stripping steam to achieve this level of $H_2S$ in the purified gas is determined to be 142,750 pounds per hour (saturated steam at 14.7 psi having a heat content of 950 BTU per pound) at the maximum gas flow of 26,700 lb. mols/hr. That flow of stripping steam is introduced at the bottom of a regenerator equipped with a mass transfer section packed with 4,295 cubic feet of pall ring packing 2 inches in diameter and length and arranged in a bed 12.5 feet in diameter and 35 feet deep. Pressure at the top of the regenerator is 8 psig.

While holding the steam stripping rate constant at 142,750 pounds of steam per hour, and the gas flow rate constant at 26,700 lbs. mols/hr. the solution flow rate is varied from zero to 9,800 gallons per minute and the residual concentration of $CO_2$ and of $H_2S$ in the purified gas determined at various solution flow rates under these conditions. The results of operating the system in this manner is illustrated in the graph shown in FIG. 2. In FIG. 2 the solution flow rate is shown on the horizontal axis. The residual concentrations of $CO_2$ in the purified gas are shown by curve 100 with the $CO_2$ concentration values shown on the left vertical axis. The residual concentration of $H_2S$ in the purified gas are shown by curve 200 with the $H_2S$ concentration values shown on the right vertical axis. As shown by FIG. 2, the $H_2S$ concentration in the purified gas remains at a constant value of 0.08% (0.24 psi partial pressure) over most of the range of solution flow rates, namely from point A (solution flow rate of 2,600 gallons/minute) to point B (solution flow rate of 9,100 gallons/minute). Over the lowest solution flow rates, viz. from zero to 1,800 gallons/minute, the $H_2S$ concentration drops rapidly from the initial concentration in the raw gas, viz. 1% to the desired value of 0.08% at 2,600 gallons/minute. In sharp contrast, the $CO_2$ concentration in the purified gas undergoes a continuous and several-fold change over the same range of solution flow rates at which the $H_2S$ concentration remains constant at 0.08%, undergoing a continuous increase as the solution flow rate decreases from point B to point A. Because of this completely different response in the behavior of the $CO_2$ and $H_2S$ as the solution/gas ratio varies at a constant steam/gas ratio, the selectivity of $H_2S$ absorption can be maximized by selecting the solution/gas ratio in the vicinity of point A where the partial pressure of $H_2S$ in the purified gas remains at the desired value and where the difference between the partial pressure of $CO_2$ and $H_2S$ in the purified gas reaches a maximum level. Both the selected solution/gas ratio and the selected steam/gas ratio are then maintained constant as gas flow varies. By so operating the system both $H_2S$ concentration and $CO_2$ concentration in the purified gas remain constant despite a four-fold change in the gas flow rate, that is, as the gas flow varies from 6675 to 26,700 lb. mols/hr. Thus, the concentration of $H_2S$ in the purified gas remains substantially constant at a value of 0.08% (a partial pressure of 0.24 psi) representing 92.5% $H_2S$ removal and the $CO_2$ concentration similarly remains substantially constant at a value of about 10.6% (a partial pressure of 31.8 psi) representing only 33.6% $CO_2$ removal. This gives a constant $H_2S$ selectivity ratio (ratio of percent removal of $H_2S$ to percent removal of $CO_2$) of 2.75 and gives a regenerator off-gas containing 15.5% and 84.5% $CO_2$.

In the foregoing example the mass transfer capacity of the regenerator is such that the regeneration of the solution is kinetically limited with respect to $CO_2$ desorption with the result that the temperature of the gases leaving the top of the regenerator is 4.4° C. higher than the after flash temperature of the scrubbing solution at the top of the regenerator.

EXAMPLE 2

The operating conditions of Example 1 are duplicated in all respects except that the regenerator is provided with a much larger mass transfer capacity. Instead of a section packed with 4,295 cubic feet of pall ring packing 2 inches in diameter and length and arranged in a bed 12.5 feet in diameter and 35 feet deep, a section was used packed with 11,045 cubic feet of the same packing in a bed 12.5 feet in diameter and 90 feet deep (approximately 2.6 times as much transfer capacity as in Example 1). With this additional mass transfer capacity, the kinetic limitation with respect to $CO_2$ desorption is substantially eliminated and the temperature differential between the after flash solution temperature and the temperature of the gas phase at the top of the regenerator is reduced to 1.7° C. Under these conditions the point of maximum selectivity occurs at the same solution/gas ratio, but more $CO_2$ is absorbed with the result that there is less $H_2S$ selectivity and the regenerator off-gas is leaner in $H_2S$. The following table summarizes the results of Example 2 as compared to Example 1:

|  | Example 1 | Example 2 |
|---|---|---|
| % $H_2S$ in purified gas | 0.08% | 0.08% |
| % removed of $H_2S$ | 92.5% | 92.5% |
| % $CO_2$ in purified gas | 10.6% | 8.9% |
| % removed of $CO_2$ | 33.6% | 45.4% |
| $H_2S$ selectivity ratio | 2.75 | 2.04 |
| % $H_2S$ in regenerator off-gas | 15.5% | 12.0% |
| % $CO_2$ in regenerator off-gas | 84.5% | 88.0% |

EXAMPLE 3

The operating conditions of Example 1 are duplicated in all respects except that the regenerator is provided with a smaller mass transfer capacity. Using the same packing as in Example 1, and the same bed diameter, the depth of the bed was reduced from 35 feet to 20 feet with the result that the regenerator became more kinetically limited with respect to $CO_2$ absorption and the temperature differential between the after flash solution temperature and the temperature of the gas phase at the top of the regenerator increased from 4.4° C. to 4.7° C. Under these conditions the point of maximum selectivity occurs at the same solution/gas ratio, but less $CO_2$ is absorbed with the result that there is higher $H_2S$ selectivity and the regenerator off gas is richer in $H_2S$. The following table summarizes the results of Example 3 compared to Example 1:

|  | Example 1 | Example 3 |
|---|---|---|
| % $H_2S$ in purified gas | 0.08% | 0.08% |
| % removal of $H_2S$ | 92.5% | 92.4% |

-continued

|  | Example 1 | Example 3 |
|---|---|---|
| % CO$_2$ in purified gas | 10.6% | 11.3% |
| % removal of CO$_2$ | 33.6% | 28.6% |
| H$_2$S selectivity ratio | 2.75 | 3.23 |
| % H$_2$S in regenerator off gas | 15.5% | 17.7% |
| % CO$_2$ in regenerator off gas | 84.5% | 82.3% |

Reference is now made to FIG. 3 of the drawings showing a second embodiment of the invention. The system of FIG. 3 includes a two stage regeneration system in which a minor portion of the scrubbing solution is subjected to a higher degree of regeneration and also includes means for cooling the regenerated scrubbing solution as it is recycled from the regenerator to the absorber. The system of FIG. 3, operating at a lower absorption temperature permits the H$_2$S level in the purified gas to be reduced to a lower level while still maintaining good H$_2$S selectivity.

The system of FIG. 3 comprises an absorber 33 having two mass transfer sections C and D equipped with suitable packing materials to promote intimate gas-liquid contact, and a regeneration column 34 having similarly equipped mass transfer sections E and F. The raw hot feed gas enters the system by line 35 and passes through tube bundle 36 of reboiler 37 where stripping steam is generated. The partially cooled feed gas leaves the reboiler by line 38, passes through a knock-out drum 39, where condensate is removed and leaves the system by line 40. It then flows by line 41 to a boiler feed water heater 42 where further heat is abstracted from the gas before it is delivered to the bottom of the absorber by line 43. The raw gas flows upwardly through the absorption column countercurrent to the scrubbing solution introduced into the absorption column by lines 44 and 45 and the purified gas leaves by line 46.

The spent scrubbing solution containing absorbed CO$_2$ and H$_2$S accumulates at the bottom of the column in sump 47 from where it is conducted by line 48, pressure let-down valve 49, and line 50, to the top of regenerator 34 operating at a pressure in the vicinity of atmospheric. In regenerator 34, the scrubbing solution is steam-stripped in two sections. In the upper section, provided with mass transfer Section E, all of the solution is subjected to countercurrent contact with stripping steam introduced into the bottom of the column. The solution then collects on chimney tray 51. The major portion of the solution usually from 60% to 90% of the total at an intermediate stage of regeneration, is drawn off from chimney tray 51 by line 52, passes through a cooler 53 and is then recycled by pump 54 and line 45 to an intermediate level in the absorber above mass transfer Section D.

A minor portion of the solution, usually from 10% to 40% of the total overflows chimney tray 51 and flow downwardly into the lower portion of the regenerator equipped with mass transfer Section F where it is subjected to further steam stripping. The more thoroughly regenerated minor portion of the circulating solution collects at the bottom of the regenerator on trapout tray 55. Solution is withdrawn from tray 55 by line 56 and circulated through reboiler 37 where it passes over tube bundle 36 heated by the hot feed gas. Steam generated by contact of the solution with tube bundle 36 is introduced into the bottom of the regenerator by line 57 and flows upwardly through mass transfer Section F, passes through chimney tray 51 as shown by the arrows, and then passes upwardly through mass transfer Section E.

The scrubbing solution in reboiler 37 overflows weir 58, is withdrawn from the reboiler by line 59, and introduced into the bottom of regenerator column 34 where it collects in sump 60. From sump 60, the more thoroughly regenerated minor portion of the solution is withdrawn by line 61, passes through cooler 62 and is recycled to the top of the absorber by pump 63 and line 44.

The mixture of steam and desorbed gases collecting at the top of the regenerator is removed by line 64 and flows to a condenser 65 cooled by a cooling medium supplied by line 66 and leaving by line 67. As in FIG. 1, sufficient water is condensed to maintain water balance in the scrubbing system, the water condensate being fed by line 68 and 69 to the top of the regenerator. Excess condensate may be purged through line 70. The partially cooled mixture consisting principally of steam, H$_2$S and CO$_2$ leaves the system by line 71 for any desired further treatment.

The operation of the system of FIG. 3 is similar to that of FIG. 1 already described in detail and will be illustrated by Example 4. The system of FIG. 3 is generally preferred in those cases where it is desired to reduce the residual partial pressure of H$_2$S in the purified gas to a low level and still maintain good H$_2$S selectivity, or where a lower absorption temperature is desired to prevent the production of potassium formate through the reaction of carbon monoxide with potassium carbonate, or both. A lower absorption temperature of course requires that the feed gas be cooled to a lower temperature and for this reason, a boiler feed water heater 42 is employed to recover heat from the feed gas while lowering its temperature.

A lower residual partial pressure of H$_2$S in the purified gas while keeping the amount of stripping steam at a reasonable level is possible with the system of FIG. 3 since the solution fed to the top of the absorber is more thoroughly regenerated and is at a reduced temperature, both of which reduce the equilibrium partial pressure of H$_2$S above the regenerated solution. The required steam/gas ratio required is substantially reduced since only a minor portion of the solution is thoroughly regenerated and because cooling is used to reduce the equilibrium partial pressure of H$_2$S above the solution at the top of the absorber.

EXAMPLE 4

This example illustrates the use of the system of FIG. 3 for the purification of a gas mixture produced by the pressure gasification of coal which has the following composition after water scrubbing to remove tar and particulates:

| Component | Mol Percent |
|---|---|
| CO$_2$ | 5.3 |
| H$_2$S | 1.0 |
| N$_2$ | 46.65 |
| CO | 29.0 |
| H$_2$ | 17.0 |
| CH$_4$ | 1.0 |
| COS | 0.05 |

As in Example 1, the purified gas is used as the feed gas to a combined power cycle where the gas is burned and passed through gas turbines and steam generation units. The variable load demand of the power cycle results in a fourfold variation in feed gas flow to the purification unit with the flow changes occurring over short time intervals. At full flow rate the raw gas feed to the reboiler through line 35 is 18,000 lb. mols. per hour (dry basis) of gas of the above composition at a temperature of 148° C. and a pressure of 320 psig and saturated with water vapor. At minimum gas flow, the rate is 4500 lb. mols. per hour (dry basis).

The level of $H_2S$ purity in the purified gas is selected at 0.0175% (a partial pressure of $H_2S$ in the purified gas of 0.055 psi). The amount of stripping steam to achieve this level of $H_2S$ in the purified gas is 50,525 pounds per hour (saturated steam at 14.7 psi having a heat content of 950 BTU per pound) at the maximum gas flow of 18,000 lb. mols./hr. As the gas flow varies the steam/gas ratio is held substantially constant, namely at a value of 2.8 pounds of steam per lb. mol. of gas flow. That amount of stripping steam generated in reboiler 37 by the hot feed gas is introduced into the bottom of the regenerator through line 57 and flows upwardly through mass transfer section F consisting of a packed bed 8.0 feet in diameter and 20 feet high equipped with metal pall rings two inches in diameter and length, and then, after passing through chimney tray 51, flows upwardly through mass transfer section E consisting of a packed bed 8.0 feet in diameter and 30 feet high also equipped with metal pall rings two inches in diameter and length. The pressure at the top of the regenerator is 4.5 psig while the pressure at the bottom is 6.5 psig.

After passing through tube bundle 36 of reboiler 35, the hot feed gas passes through boiler feed water heater 42 where its temperature is reduced to 85° C. and then enters absorber 33 at a pressure of 310 psig through line 43 and passes upwardly through mass transfer section D consisting of a packed bed 9.0 feet in diameter and 25 feet high equipped with metal pall rings two inches in diameter and length and mass transfer section C consisting of a packed bed 9.0 feet in diameter and 15 feet deep equipped with metal pall rings $1\frac{1}{2}$ inches in diameter and length. The absorbed solution is a 30% by weight aqueous potassium carbonate solution.

The absorber is supplied at the maximum gas flow rate by line 44 with 388 gallons per minute (gpm) of regenerated scrubbing solution which leaves the bottom of regenerator tower 34 by line 61 at a temperature of 114.5° C. and is cooled in cooler 62 to 85° C. at which temperature it enters the top of the absorber. The absorber is also supplied at maximum gas flow rate by line 45 with 776 gpm of less thoroughly regenerated solution which leaves the regenerator by line 52 at a temperature of 110° C. and is cooled in cooler 53° to 85° C. at which temperature it enters the absorber. The solution leaves the bottom of the absorber at a temperature of 95° C. and is recycled to the top of the regenerator. The total solution flow to the absorber is 1164 gpm at the full gas feed rate of 18000 lb. mols./hr. and this flow is varied in response to changes in gas flow so that the solution/gas ratio is maintained substantially constant, namely at a value of 3.9 gallons per lb. mol. of gas flow. At this value the $H_2S$ content of the purified gas is maintained at a substantially constant value of 0.0175% (partial pressure of 0.055 psi) while the $CO_2$ content of the purified gas is maintained substantially constant at 3.18% (partial pressure of 10.05 psi) regardless of variations in the gas flow. This represents 98.3% removal of the $H_2S$ content and 42.0% removal of the $CO_2$ content of the raw gas, an $H_2S$ selectivity ratio of 2.34, and gives a constant composition of the regenerator off-gas viz. 31.0% $H_2S$ and 69.0% $CO_2$. If the solution/gas ratio is decreased by ten percent or even less from the value of 3.9 gallons per lb. mol. of gas flow, the $H_2S$ content of the purified gas begins to rise rather sharply.

If the solution/gas ratio is increased above the value of 3.9 gallons per lb. mol. of gas flow, the $H_2S$ content of the purified gas remains constant but the $CO_2$ content steadily increases, thus decreasing the $H_2S$ selectivity. The solution/gas ratio of 3.9 gallons per minute thus represents the operating condition where optimum $H_2S$ selectivity is obtained while the $H_2S$ content in the purified gas is maintained at the desired low value of 0.00175% (partial pressure of 0.055 psi).

In contrast to Example 1 it will be noted that in this Example 4, the $H_2S$ content in the purified gas is reduced to a considerably lower value (an $H_2S$ partial pressure of 0.055 psi in this Example 4 versus an $H_2S$ partial pressure of 0.24 in Example 1) while still obtaining a good $H_2S$ selectivity ratio and an economical steam/gas ratio. This result is obtained by the use of the two stage absorber and regenerator system shown in FIG. 3 where a portion of the solution is more thoroughly regenerated and fed to the top of the absorber and where all of the solution as well as the entering raw gas is cooled to 85° C. The use of the lower absorption temperature in this Example 4 also reduced the rate of formation of potassium formate to a substantially lower value.

We claim:
1. A method for selectively removing $H_2S$ from a gas mixture containing $H_2S$ and $CO_2$ in a molar ratio in excess of $4CO_2:1H_2S$ wherein said gas mixture undergoes substantial variation in flow rate comprising the steps of:
(a) Countercurrently contacting said gas mixture in an absorption zone with an aqueous scrubbing solution of alkali metal carbonate at an absorption temperature of at least 60° C. and under super-atmospheric pressure thereby absorbing $CO_2$ and $H_2S$ in said solution,
(b) Regenerating said solution in a regeneration zone at approximately atmospheric pressure by countercurrently steam stripping said solution,
(c) Supplying stripping steam to said regeneration zone at a steam/gas ratio selected to reduce the equilibrium partial pressure of $H_2S$ above said solution at the bottom of the regenerator to a value which will provide the desired partial pressure of $H_2S$ in the purified gas leaving said absorption zone,
(d) Controlling the partial pressure of $H_2S$ in the purified gas at a substantially constant value by maintaining said selected steam/gas ratio substantially constant as said gas flow varies,
(e) Adjusting the solution/gas ratio in said absorption zone to a selected ratio in the vicinity of that at which the partial pressure of $H_2S$ in the purified gas remains at said desired value and at which the difference between the partial pressure of $CO_2$ and $H_2S$ in the purified gas reaches a maximum level,
(f) Maintaining said selected solution/gas ratio at a substantially constant value as said gas flow varies,
whereby the purified gas is selectively reduced in $H_2S$ content and whereby the ratio of $H_2S$ to $CO_2$ absorbed is rendered substantially independent of variations in gas flow.

2. A method in accordance with claim 1 including the step of restricting the mass transfer capacity of said regeneration zone such that the steam/gas mixture leaving the top of said regenerator is at a higher temperature than the after flash temperature of the solution at the top of said regenerator, thereby further increasing the selectivity of $H_2S$ absorption.

3. A method in accordance with claim 1 in which mass transfer portion of said regeneration zone is provided with packing.

4. A method in accordance with claim 1 in which the scrubbing solution is a concentrated aqueous solution of potassium carbonate.

5. A method in accordance with claim 1 in which the regenerated scrubbing solution is cooled between the regeneration and absorption zones.

6. A method in accordance with claim 1 in which a minor portion of the solution is subjected to more thorough regeneration and is cooled, and separately recycled to the top portion of the absorption zone.

7. A method in accordance with claim 1 in which the gas to be purified contains from 4% to 35% $CO_2$, from 0.4% to 2% $H_2S$ and in which the molar ratio of $CO_2$ to $H_2S$ ranges from 6:1 to 30:1.

8. A method for selectively removing $H_2S$ from a gas mixture containing $H_2S$ and $CO_2$ in a molar ratio in excess of $4CO_2:H_2S$ wherein said gas mixture undergoes substantial variation in flow rate comprising the steps of:

(a) Countercurrently contacting said gas mixture in an absorption zone with an aqueous scrubbing solution of alkali metal carbonate at an absorption temperature of at least 60° C. and under super-atmospheric pressure thereby absorbing $CO_2$ and $H_2S$ in said solution, (b) Regenerating said solution in a regeneration zone at approximately atmospheric pressure by countercurrently steam stripping said solution, (c) Restricting the mass transfer capacity of said regeneration zone such that the steam/gas mixture leaving the top of said regenerator is at a higher temperature than the after-flash temperature of the solution at the top of said regenerator, (d) Supplying stripping steam to said regeneration zone at a steam/gas ratio selected to reduce the equilibrium partial pressure of $H_2S$ above said solution at the bottom of the regenerator to a value which will provide the desired partial pressure of $H_2S$ in the purified gas leaving said absorption zone, (e) Controlling the partial pressure of $H_2S$ in the purified gas at a substantially constant value by maintaining said selected steam/gas ratio substantially constant as said gas flow varies, (f) Adjusting the solution/gas ratio in said absorption zone to a selected ratio in the vicinity of that at which the partial pressure of $H_2S$ in the purified gas remains at said desired value and at which the difference between the partial pressure of $CO_2$ and $H_2S$ in the purified gas reaches a maximum level, (g) Maintaining said selected solution/gas ratio at a substantially constant value as said gas flow varies, whereby the purified gas is selectively reduced in $H_2S$ content and whereby the ratio of $H_2S$ to $CO_2$ absorbed is rendered substantially independent of variations in gas flow.

9. A method in accordance with claim 8 in which the temperature of the steam/gas mixture leaving the top of said regenerator is from 2° C. to 10° C. higher than the after-flash temperature of the solution at the top of the regenerator.

10. A method in accordance with claim 8 in which the scrubbing solution is a concentrated aqueous solution of potassium carbonate.

* * * * *